UNITED STATES PATENT OFFICE.

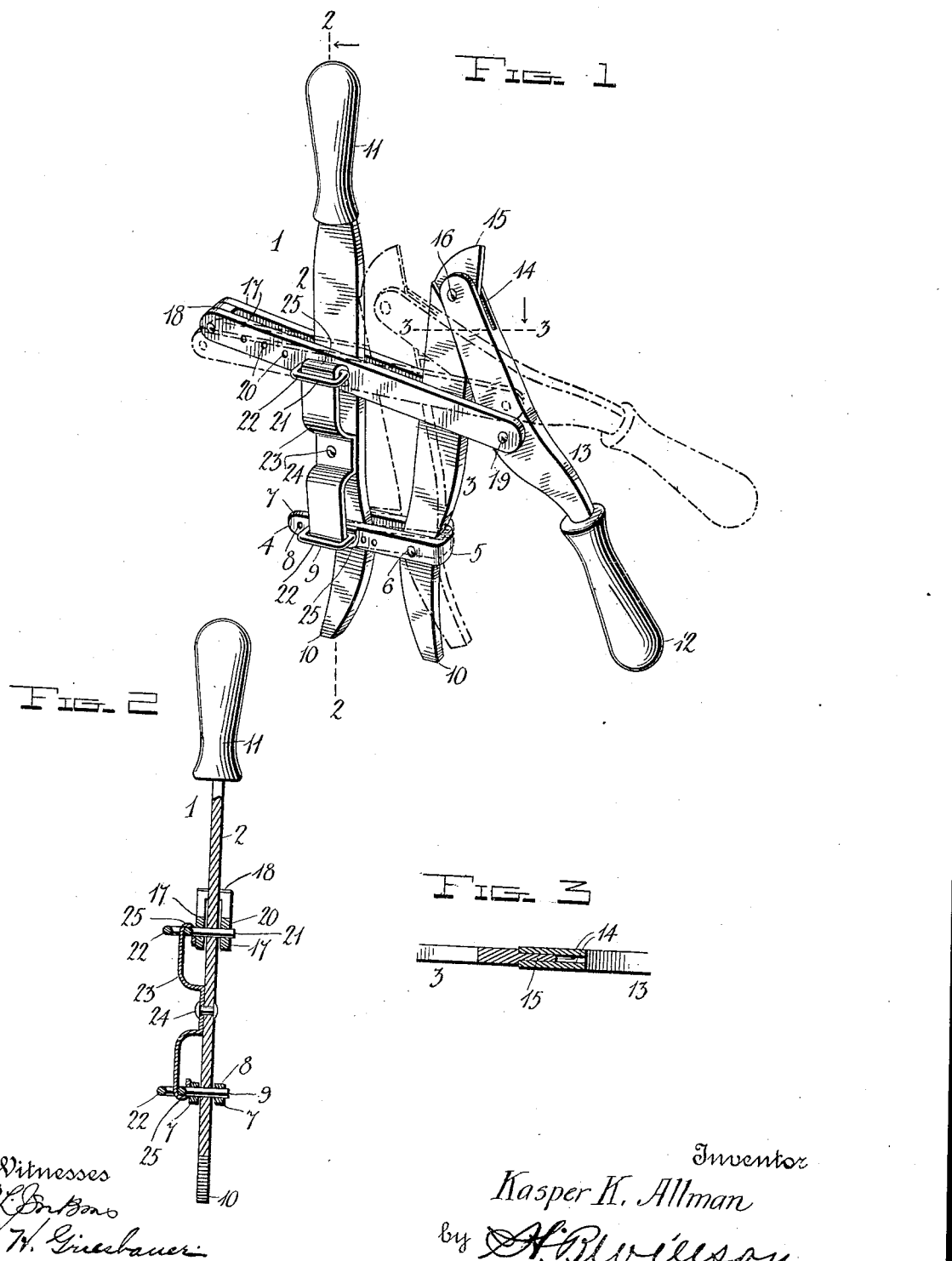

KASPAR K. ALLMAN, OF ALUMBRIDGE, WEST VIRGINIA.

HORSESHOE-SPREADER.

No. 823,383.  Specification of Letters Patent.  Patented June 12, 1906.

Application filed November 16, 1905. Serial No. 287,681.

*To all whom it may concern:*

Be it known that I, KASPAR K. ALLMAN, a citizen of the United States, residing at Alumbridge, in the county of Lewis and State of West Virginia, have invented certain new and useful Improvements in Horseshoe-Spreaders; and I do declare the following to be a full, clear, and exact description of the invention, such as will enable others skilled in the art to which it appertains to make and use the same.

My invention relates to improvements in devices for spreading horseshoes; and it consists in the novel construction, combination, and arrangement of parts, as will be hereinafter described and claimed.

The object of the invention is to provide a device or tool of this character which will be simple in construction, durable in use, efficient in operation, and comparatively inexpensive to manufacture.

The above and other objects are accomplished by the construction illustrated in the accompanying drawings, in which—

Figure 1 is a perspective view of my improved horseshoe-spreader, showing in full and dotted lines the two positions of the same; and Figs. 2 and 3 are detail sectional views taken, respectively, on the line 2 2 and 3 3 in Fig. 1.

Referring to the drawings by numeral, 1 denotes my improved horseshoe-spreader, which comprises two jaw members or levers 2 3, which are adjustably pivoted together by means of a cross-bar 4. The latter is in the form of a U-shaped link or bar and has the member or lever 3 fixed in its closed end 5 by a rivet or similar fastening 6. The opposite ends or arms 7 of the bar 4 are formed with alining apertures or openings 8 to receive a pivot-pin 9, which also passes through an opening in the member or lever 2, so that the latter is pivotally mounted and may be adjusted toward and from the member 2 to vary the space between the two jaws 10, which are formed or provided upon the adjacent end of the members or levers 2 3. The opposite end of the member 2, which latter is substantially straight, has a handle 11 formed or secured thereon. A similar handle 12 is provided upon the free end of an operating-lever 13, which has its inner end bifurcated, as shown at 14, to receive the reduced upper end 15 of the member 3, to which it is pivoted by a rivet, bolt, or the like 16. The hand or operating lever 13 is connected to the lever or member 2 by a pair of links 17, which are disposed in parallel relation upon the opposite sides of the levers 2, 3, and 13 and have their free ends united, as shown at 18. Their opposite ends are pivoted by a rivet, bolt, or the like 19 upon the opposite sides of the lever 13, which is preferably slightly curved, as shown. The connection between the links 17 and the lever 2 is an adjustable and pivotal one, and it is preferably effected by forming in the links 17 alining openings 20 to receive a pivot-pin 21, which also passes through an opening formed in the member or lever 2. The pivot-pins 9 and 21 are each formed with loops or finger-pieces 22 upon one end, and they are adapted to be retained in the parts which they pivotally connect by means of a spring 23. The latter is secured, as at 24, upon one face of the member or lever 22 and has its opposite ends bent to form spring-arms 25, which are secured to said pivot-pins 9 and 21 and retain the latter in their proper positions. These pivot-pins are thus prevented from slipping out and becoming lost or misplaced; but at the same time they may be quickly removed or applied to adjust the different parts for the purpose of varying the leverage and the movement of the jaws 10.

The construction, operation, and advantages of the invention will be readily understood upon reference to Fig. 1 of the drawings. It will be seen that when the parts are properly adjusted the two jaws 10 are inserted between the ends of the horseshoe to be expanded and the handles 11 12 are swung from their full-line to their dotted-line position. (Shown in Fig. 1.)

Various changes in the form, proportion, and the minor details of construction may be resorted to without departing from the principle or sacrificing any of the advantages of the invention.

Having thus described my invention, what I claim as new, and desire to secure by Letters Patent, is—

1. A device of the character described comprising two pivotally-connected members, a hand-lever pivoted to one of said members and an adjustable link connection between said hand-lever and the other of said members.

2. A device of the character described comprising two swinging jaw members, a cross-bar adjustably and pivotally connecting said members, a handle upon one of said members, a hand-lever pivoted to the other of said members, and a link connecting said hand-lever and the member having said handle.

3. A device of the character described comprising two swinging jaw members, a cross-bar adjustably and pivotally connecting said members, a handle upon one of said members, a hand-lever pivoted to the other of said members, and an adjustable link connection between said hand-lever and the member carrying said handle.

4. A device of the character described comprising a pair of jaw members, a pivot-pin for pivotally connecting the same, a hand-lever upon one of said members, a link connecting said hand-lever and the other of said members, a pivot-pin for pivoting said link to said member, and a spring upon the latter having its ends or arms connected to said pivot-pins, substantially as shown and described.

5. A device of the character described comprising jaw members, a cross-bar pivotally connecting said members and formed with a series of apertures, a pivot-pin coacting with said apertures to adjustably connect said bar to one of said members, a hand-lever pivoted to one of said members, a link connecting said hand-lever and the other of said members, said link being formed with a series of apertures, a pin inserted in one of said apertures to adjustably connect said link to said member, and a spring upon the latter member having its ends or arms engaged with said pivot-pins, substantially as described and for the purpose set forth.

In testimony whereof I have hereunto set my hand in presence of two subscribing witnesses.

KASPAR K. ALLMAN.

Witnesses:
J. M. JARVIS.
H. J. WILL.